United States Patent
Tejedor et al.

(10) Patent No.: US 9,894,678 B2
(45) Date of Patent: Feb. 13, 2018

(54) METHODS, A WIRELESS DEVICE AND A RADIO NETWORK NODE IN A WIRELESS COMMUNICATION SYSTEM

(71) Applicant: Telefonaktiebolaget L M Ericsson (publ), Stockholm (SE)

(72) Inventors: Erika Tejedor, Stockholm (SE); Christian Bergljung, Lund (SE); Olav Queseth, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 18 days.

(21) Appl. No.: 14/432,512

(22) PCT Filed: Aug. 8, 2014

(86) PCT No.: PCT/SE2014/050926
§ 371 (c)(1),
(2) Date: Mar. 31, 2015

(87) PCT Pub. No.: WO2015/137858
PCT Pub. Date: Sep. 17, 2015

(65) Prior Publication Data
US 2016/0262171 A1    Sep. 8, 2016

Related U.S. Application Data
(60) Provisional application No. 61/952,927, filed on Mar. 14, 2014.

(51) Int. Cl.
*H04W 72/12* (2009.01)
*H04W 88/06* (2009.01)

(52) U.S. Cl.
CPC ... *H04W 72/1257* (2013.01); *H04W 72/1226* (2013.01); *H04W 88/06* (2013.01)

(58) Field of Classification Search
None
See application file for complete search history.

(56) References Cited

U.S. PATENT DOCUMENTS
2013/0044621 A1* 2/2013 Jung ............... H04W 72/082
370/252

FOREIGN PATENT DOCUMENTS
| EP | 2242318 A1 | 10/2010 |
| EP | 2705711 A1 | 3/2014 |

(Continued)

OTHER PUBLICATIONS
3GPP, "3rd Generation Partnership Project; Technical Specification Group GSM/EDGE Radio Access Network; Radio transmission and reception (Release 1999)", 3GPP TS 05.05 V8.20.0, Nov. 2005, 1-100.

(Continued)

*Primary Examiner* — Andrew Lai
*Assistant Examiner* — Jamaal R Henson
(74) *Attorney, Agent, or Firm* — Murphy, Bilak & Homiller, PLLC (57) ABSTRACT

Methods, wireless device (110) and radio network node (120) for scheduling transmissions are disclosed. The wireless device (110) sends, to the radio network node (120), information relating to emissions, from the wireless device (110), when the wireless device (110) operates according an operating configuration. The radio network node (120) schedules the transmissions based on the information. Then, the wireless device (110) is scheduled, by the radio network node (120), based on the information. Corresponding computer programs and carriers also are disclosed.

24 Claims, 4 Drawing Sheets

(56) References Cited

FOREIGN PATENT DOCUMENTS

| WO | 2008033796 A2 | 3/2008 | |
| WO | WO-2008033796 A2 * | 3/2008 | .......... H04W 52/265 |
| WO | 2012150887 A1 | 11/2012 | |
| WO | WO-2012150887 A1 * | 11/2012 | ............ H04W 28/18 |

OTHER PUBLICATIONS

3GPP, "3rd Generation Partnership Project; Technical Specification Group Radio Access Network; Base Station (BS) radio transmission and reception (FDD) (Release 12)", 3GPP TS 25.104 V12.3.0, Jun. 2014, 1-113.

3GPP, "3rd Generation Partnership Project; Technical Specification Group Radio Access Network; Base Station (BS) radio transmission and reception (TDD) (Release 11)", 3GPP TS 25.105 V11.8.0, Dec. 2014, 1-119.

3GPP, "3rd Generation Partnership Project; Technical Specification Group Radio Access Network; Evolved Universal Terrestrial Radio Access (E-UTRA); Base Station (BS) radio transmission and reception (Release 12)", 3GPP TS 36.104 V12.4.0, Jun. 2014, 1-150.

3GPP, "3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.4.0, Jun. 2014, 1-531.

3GPP, "3rd Generation Partnership Project; Technical Specification Group Radio Access Network; LTE for 700 MHz digital dividend (Release 11)", 3GPP TR 36.820 V11.2.0, Dec. 2012, 1-35.

3GPP, "3rd Generation Partnership Project; Technical Specification Group Radio Access Network; User Equipment (UE) radio transmission and reception (FDD) (Release 12)", 3GPP TS 25.101 V12.4.0, Jun. 2014, 1-364.

3GPP, "3rd Generation Partnership Project; Technical Specification Group Radio Access Network; User Equipment (UE) radio transmission and reception (TDD) (Release 11)", 3GPP TS 25.102 V11.6.0, Dec. 2013, 1-246.

Unknown, Author, "Band 13: spurious emission and sensitivity", TSG-RAN Working Group 4 (Radio) meeting #48, R4-081954, Ericsson, Jeju, South Korea, Aug. 18-22, 2008, 1-10.

* cited by examiner

METHODS, A WIRELESS DEVICE AND A RADIO NETWORK NODE IN A WIRELESS COMMUNICATION SYSTEM

TECHNICAL FIELD

Embodiments herein relate to wireless communication systems, such as telecommunication systems. In particular, a method and a related wireless device for assisting the radio network node to schedule transmissions from the wireless device as well as a method and a related radio network node for scheduling transmissions of a wireless device are disclosed. Corresponding computer programs and carriers therefor are also disclosed.

BACKGROUND

Usage of radio spectrum, or spectrum for short, is regulated independently within different countries, or regions. An authority regulating spectrum usage in a certain region may be referred to as a regulator. Radio communication systems, such as cellular telecommunication systems, are developed and designed for different spectrum ranges, or operating bands. An operating band may be referred to as an operating frequency band.

An operating frequency band supports a specific duplex mode of operation. The possible duplex modes are frequency division duplex (FDD), time division duplex (TDD) and half duplex FDD (HD-FDD). In FDD mode of operation, which is used in Universal Terrestrial Radio Access Networks (UTRAN) FDD and Evolved Universal Terrestrial Radio Access Networks (E-UTRAN) FDD, the uplink and downlink transmission take place on different carrier frequencies. Reference is made to Third Generation Partnership Project (3GPP) TS 25.101, "User Equipment (UE) radio transmission and reception (FDD)", 3GPP TS 25.104, "Base station (BS) radio transmission and reception (FDD)", and 3GPP TS 36.101, "Evolved Universal Terrestrial Radio Access (E-UTRA) and Evolved Universal Terrestrial Radio Access (E-UTRAN); User Equipment (UE) radio transmission and reception" and 3GPP TS 36.104, "Evolved Universal Terrestrial Radio Access (E-UTRA) and Evolved Universal Terrestrial Radio Access (E-UTRAN); Base station (BS) radio transmission and reception". Therefore, in FDD mode both uplink and downlink transmission can occur simultaneously in time. Carrier frequencies used, by a radio transceiver, in the uplink and the downlink are referred to as pass band for uplink and downlink, respectively. The minimum distance in frequency between the uplink and downlink pass bands is referred to as a duplex gap. The distance in frequency between the uplink and downlink carrier frequencies is referred to transmit-receive (TX-RX) frequency separation for the radio transceiver. The TX-RX frequency separation can be fixed, aka default, or variable. In the latter case the TX-RX frequency separation is configurable by the network.

On the other hand in TDD mode, which is used in UTRAN TDD and E-UTRAN TDD, the uplink and downlink transmission take place on the same carrier frequency channel but in different time slots or sub-frames. Reference is made to 3GPP TS 25.102, "User Equipment (UE) radio transmission and reception (TDD)", 3GPP TS 25.105 "Base Station (BS) radio transmission and reception (TDD)", 3GPP TS 36.101, "Evolved Universal Terrestrial Radio Access (E-UTRA) and Evolved Universal Terrestrial Radio Access (E-UTRAN); User Equipment (UE) radio transmission and reception", 3GPP TS 36.104, "Evolved Universal Terrestrial Radio Access (E-UTRA) and Evolved Universal Terrestrial Radio Access (E-UTRAN); Base station (BS) radio transmission and reception".

HD-FDD, which is used in Global System for Mobile Communications (GSM), can be regarded as a hybrid scheme where the uplink and downlink are transmitted on different carrier frequencies and are also transmitted on different time slots. Reference is made to 3GPP TS 05.05, "Radio Transmission and Reception". This means uplink and downlink transmission do not occur simultaneously in time.

Returning to spectrum usage, one of the objectives of standardizing spectrum usage is to develop an operating band which can, preferably, be used globally. A global operating band leads to several advantages in terms of global roaming, reduced cost of the products due to the economy of scale, simplicity in building products/devices since the same or at least limited platforms/devices can be reused globally or regionally etc. However certain country specific and even operator specific frequency bands are unavoidable due to the fact that the spectrum availability for the mobile services may be fragmented in different country and even within a country. Furthermore, the regulators in each country independently allocate the frequency band in accordance with the available spectrum. Also the spectrum below 1 GHz due to its favourable propagation characteristics might be scarce or fragmented due to higher demand by other competing technologies. Additionally already existing services in a frequency band may be difficult to move or deprecate which makes certain frequencies available at different times. The assigned spectrum is eventually standardized in 3GPP in terms of frequency bands so that vendors can develop the products e.g. BS (base stations) and UE. Hence there might be a frequency band that is completely allocated in one region while a different region just allocates part of it. For example, Band 28, was initially allocated in the APAC region, the band is specified for FDD as 703-748 MHz for uplink (UL) and 758-803 MHz for downlink (DL). Some specific regions, as Japan will also deploy this band. However, not the complete spectrum can be allocated to International Mobile Telecommunications (IMT) but only 718-748 MHz/783-803 MHz. At the same time, Europe is also considering this spectrum and a part of the band may become available for wideband services.

UE roaming between different regions is a driver for making spectrum globally harmonized. From this perspective, the same UE can operate on a specific operating band in different regions even if the allocations and regulatory conditions are slightly different.

Another objective of standardizing spectrum usage is to develop an operating band which can guarantee that radio emissions outside the operating band are below certain levels.

The radio emissions outside the operating band occurs due to that although a wireless device typically operates in a well-defined portion of the frequency band, emissions outside the operating band or channel bandwidth, and also outside its operating frequency band, are unavoidable. These emissions outside the BW or frequency band are often termed as out of band emissions, spurious emissions, unwanted emissions or Out Of Band (OOB) emissions. Human bodies are exposed to emissions (Radio Frequency, RF exposure) both inside and outside the BW and/or frequency band of operation.

These two concepts, i.e. OOB emission and RF exposure to human, and their associated signalling aspects are described below.

The UEs as well as base stations have to fulfil certain OOB emission requirements, aka spurious emission requirements. The objective of OOB emission requirements is to limit the interference caused by the transmitters, e.g. UE or BS, outside their respective channel bandwidths, i.e. carrier(s) on which transmission occur(s), to the adjacent carriers or carriers with a greater frequency separation. In fact, all wireless communication standards, e.g. GSM, UTRAN, E-UTRAN, WLAN etc., clearly specify the OOB emission requirements to limit or at least reduce the unwanted emissions. Reference is made to 3GPP TS 25.101, "User Equipment (UE) radio transmission and reception (FDD)", 3GPP TS 25.102, "User Equipment (UE) radio transmission and reception (TDD)", 3GPP TS 25.104, "Base station (BS) radio transmission and reception (FDD)", 3GPP TS 25.105 "Base Station (BS) radio transmission and reception (TDD)", 3GPP TS 36.101, "Evolved Universal Terrestrial Radio Access (E-UTRA) and Evolved Universal Terrestrial Radio Access (E-UTRAN); User Equipment (UE) radio transmission and reception", 3GPP TS 36.104, "Evolved Universal Terrestrial Radio Access (E-UTRA) and Evolved Universal Terrestrial Radio Access (E-UTRAN); Base station (BS) radio transmission and reception" and 3GPP TS 05.05, "Radio Transmission and Reception". Spurious emissions requirements are defined in order to limit the emissions outside of the operating band where the UE or BS is operating They are primarily approved and set by the national and international standardization and regulatory bodies e.g. ITU-R, FCC, ARIB, ETSI etc.

Unwanted emissions are caused by a number of things, for example: harmonic emissions, intermodulation products, non-linearities and modulation artefacts.

The major OOB and spurious emission requirements are typically specified by the standards bodies and eventually enforced by the regulators in different countries and regions for both UE and the base stations. The requirements comprise of:

Adjacent Channel Leakage Ratio (ACLR)
Spectrum Emission Mask (SEM)
Spurious emissions The specific definition and the specified level of these requirements can vary from one system to another. Typically these requirements ensure that the emission levels outside the transmitter channel bandwidth or operating band remain several tens of dB below the transmitted signal. Emission levels tend to decay dramatically further away from an operating band but they are not completely eliminated at least in the adjacent carrier frequencies.

The UE and BS have to meet the OOB and spurious emission requirements at all transmission power levels. Therefore, the UE and BS may be subject to a Maximum Power Reduction (MPR).

For the UE the conservation of its battery power is very critical. To achieve this, it is desired that the UE has an efficient power amplifier (PA). Design of an efficient PA is often a trade-off between efficiency and emission. The more efficient the PA is the more unwanted emissions, it will normally generate. The PA is designed for certain typical operating points or configurations or set of parameter settings e.g. modulation type, number of active physical channels, e.g. resource blocks in E-UTRA or number of CDMA channelization codes code/spreading factor in UTRA. In practice, the UE may operate using any combination of modulation, physical channels etc. Therefore, in some UL transmission scenarios the UE power amplifier may not be able to operate in the linear zone, thereby causing unwanted emissions due to harmonics or other non-linear characteristics. To ensure that UE fulfils OOB/spurious requirements for all allowed UL transmission configurations the UE is allowed to reduce its maximum UL transmission power in some scenarios when it reaches its maximum power. This is known in the standards as maximum power reduction (MPR) or UE power back-off in some literature. For instance a UE with maximum transmit power of 24 dBm power class may reduce its maximum power from 24 dBm to 23 or 22 dBm depending upon the transmission configuration.

The BS may also have to perform MPR but this is not standardized, Secondly the BS can afford to have a PA with larger operating range since its efficiency is less critical compared to that of UE.

The MPR values for different configurations are specified in the standard. The UE uses these values to apply MPR when the conditions for the corresponding transmission configurations are fulfilled. These MPR values are regarded as static in a sense that they are independent of resource block allocation and other deployment aspects.

In E-UTRA for LTE, an additional MPR (A-MPR) for the UE transmitter has also been specified in addition to the MPR. The difference is that the former is not fully static. Instead, the A-MPR can vary between different cells, operating frequency bands and more specifically between cells deployed in different location areas or regions. In particular the A-MPR is applied by the UE in order to meet the so-called additional spurious emission/OOB emission requirements.

The A-MPR is specified at UE maximum output power and applies in addition to the MPR. It depends on the E-UTRA channel bandwidth, position of the RBs on which the UE transmission happens as well as the number of RBs allocated for such transmission. Different A-MPR can also be specified depending on the channel position within the operating band.

A parameter known as Network Signalling (NS) is used to signal to the UE the possibility of doing power back-off in order to fulfil certain spurious/OOB emission requirements in the cell coverage area. Reference is made to 3GPP TS 36.101, "Evolved Universal Terrestrial Radio Access (E-UTRA) and Evolved Universal Terrestrial Radio Access (E-UTRAN); User Equipment (UE) radio transmission and reception". The NS value is signalled by the BS in the broadcast message. The NS is configured by the operator. In case no specific NS is signalled, the BS will send NS_01 which indicates the UE that no back-off is allowed. In the 3GPP specifications, A-MPR is specified for each NS-value.

In the UE there is a function for determining A-MPR depending on resource block allocation, carrier frequency, etc. The specified A-MPR in the 3GPP standard is the maximum allowed power back-off to be done by the UE. However, the actual power back-off by the UE may be smaller. This is implementation dependent.

The concept of A-MPR does not exist in the UTRA standard. A restriction on the maximum output power to be transmitted by the UE can be set by the network and sent in the IE (Information Element) "Maximum allowed UL TX power". Maximum output power can also be set by the eNB.

In LTE, the UE may be restricted to certain uplink resource blocks, sometimes called UL RB restriction. The UE spurious/OOB emissions depend on the allocation of the transmitted RBs as well as the number of RB used for the transmission. UL RB restrictions can be specified as an alternative to A-MPR to limit these emissions. It consists of restrictions regarding UL transmissions. These restrictions can be in terms of maximum number of RBs to be allocated for a UE and/or certain positions within the channel bandwidth. This is done in the eNB scheduler.

Another factor, different from OOB and spurious emissions, is human exposure to radiofrequency (RF) electromagnetic fields (EMF), which are transmitted by the UE. The guidelines on RF exposure to human are from the International Commission on Non-Ionizing Radiation Protection (ICNIRP, 1998) and from the Institute of Electrical and Electronics Engineers (IEEE, 1999). The limits in these recommendations are similar and they have been used as the basis for national standards and regulations in many countries. The ICNIRP guidelines, which are the most widely used recommendations, have been endorsed by the World Health Organization (WHO).

These RF exposure guidelines are science-based and the prescribed limits have been set with substantial safety margins. They provide protection from all established health effects from short-term and long-term exposure to RF fields, and the safety of children and other segments of the population have been taken into account.

Specific Absorption Rate (SAR) is introduced to measure impact on the human body from the exposure of RF EMF transmitted by the UE. SAR is a measure of the maximum energy absorbed by a unit of mass of exposed tissue of a person using a mobile phone, over a given time or more simply the power absorbed per unit mass. Advised by ICNIRP, the communication administration departments of different countries issued the SAR limits. For instance, the Federal Communications Commission (FCC) has determined that the SAR limit is 1.6 W/kg for cell phone. The SAR limit in Europe and in most countries is 2 W/kg.

The UE should comply with the SAR requirements or any type requirements for limiting the RF exposure to human which are specified by the regulator in an individual country, region, province or state etc. In order to meet these requirements, the UE may also have to reduce its maximum output power. Hence the UE maximum output power is limited by the SAR limit.

In prior art, a generic term called power management is also interchangeably used for controlling emissions to limit the SAR. The power management MPR (P-MPR) is the amount of UE power output power reduction to meet the RF exposure requirements.

In prior art, one or more parameters associated with the MPR to be applied by the UE to meet the SAR or any type of RF exposure requirements are signalled to the UE. This means the P-MPR may also be signalled to the UE. This is due to the fact that SAR or RF exposure requirements may vary from one region to another. Hence the amount of the MPR required by the UE to meet the requirements may vary from one cell to another.

In an FDD radio, a device known as duplexer or duplex filter is often used to connect the transmitter and receiver to the same antenna while at the same time it limits the signals from the transmitter that are entering the receiver. The interference from the transmitter the own receiver is also commonly termed as transmitter noise. The source of transmitter noise is the out of band. The duplexer substantially suppresses the transmitter noise. The duplexer also suppresses the blocking signal due to its own TX signal.

The design and implementation of a duplexer becomes more difficult depending upon various factors: wide pass band, small duplex gap, large stop-band requirements. As an example, in case of FDD 700 MHz or FDD Band 28, the pass band is very wide (i.e. 45 MHz in each direction) and the duplex gap is small. In this specific scenario, the 3GPP specifications have been specified assuming a dual duplexer implementation, where each duplexer is 30 MHz wide, see FIG. 3. Reference is also made to 3GPP TR 36.820, "LTE for 700 MHz digital dividend".

In a TDD radio, the transmitter and receiver is not active at the same time, therefore, TX-RX isolation is not needed. However, a filter may be desirable to fulfill certain stop-band requirements.

In the 3GPP standards, various methods of signalling of information are used. A reason for signalling is to convey information from one node to another. One method is that one node sends the information explicitly and directly to another node. Another method is to send an index into table. The content of the table is specified in the standard. The receiving node has a copy of the table and by using the index as an entry into the table the information can be retrieved. The advantage is that only the index is necessary to transfer which reduces the transmitted data. With further methods, mathematical functions or algorithms are used by a receiving node and a sending node. The mathematical function or algorithm is specified in the standard, and thus known to both the sending node and the receiving node. The input data to the function/algorithm calculated by the sending node and transmitted to the receiving node. On the receiving node, the function/algorithm is used to compute the signalled information using the transmitted input data with the function/algorithm.

EP11799210 discloses signalling regarding the characteristics of the filter/duplexer implementation by a UE. Consider a scenario, in which the UE uses more than one filter/duplexer to support an operating band, which is deployed by a network. According to EP11799210, the UE may thus signal to the radio network node the number of filter/duplexers that the UE has implemented to support the operating band. Therefore, the radio network node is able to select appropriate mobility parameters. A problem may however be that the radio network node cannot ensure that the OOB emissions will be fulfilled, i.e. that OOB emissions are at or below certain levels at certain frequencies.

SUMMARY

An object may be to alleviate or at least reduce the above mentioned problem.

According to an aspect, the object is achieved by a method performed by a radio network node, for scheduling transmissions of a wireless device. The radio network node receives, from the wireless device, information relating to emissions, from the wireless device, when the wireless device operates according an operating configuration. Then, the radio network node schedules the transmissions based on the received information.

According to another aspect, the object is achieved by a radio network node configured to schedule transmissions of a wireless device. The radio network node is configured to receive, from the wireless device, information relating to emissions, from the wireless device, when the wireless device operates according to an operating configuration. Moreover, the radio network node is configured to schedule the transmissions based on the received information.

According to yet another aspect, the object is achieved by a method, performed by a wireless device, for assisting the radio network node to schedule transmissions from the wireless device. The wireless device sends, to the radio network node, information relating to emissions, from the wireless device, when the wireless device operates according an operating configuration. The wireless device is scheduled, by the radio network node, based on the information.

According to a further aspect, the object is achieved by a wireless device configured to assist the radio network node to schedule transmissions from the wireless device, wherein the wireless device is configured to send, to the radio network node, information relating to emissions, from the wireless device, when the wireless device operates according to an operating configuration. Furthermore, the wireless device is configured to be scheduled, by the radio network node, based on the information.

According to further aspects, the object is achieved by computer programs and carriers for computer programs corresponding to the aspects above.

According to embodiments herein, the wireless device, or UE, sends information relating to emissions for an operation configuration to the radio network node.

In particular embodiments, the information relating to emissions may be exemplified as follows:

In a first method, the wireless device signals, or sends, its emissions, e.g. OOB/spurious emissions, for an operation configuration, or emission levels for multiple operating configurations.

A second method may be that the wireless device signals its compliance/non-compliance with certain emission limits with respect to (for) an operating configuration. The wireless device may also signal a set of operating configurations under which the wireless device is able to meet certain emission levels.

In an extension to the second method the wireless device signals an actual power back-off that will be required to meet regulatory requirements.

In a separate embodiment, the wireless device signals filter/duplexer characteristics that is (will be) used for a specific operating configuration.

In another embodiment, the radio network node uses the information received from the wireless device in the previous embodiments to treat wireless devices differently depending on the signalled information, such as reported operating band characteristics.

Thanks to the embodiments herein, the radio network node is able to distinguish wireless devices with different implementations, e.g. designed with one or two duplexers and their use. Therefore, the radio network node may schedule transmissions, from the wireless device(s), in different ways to ensure compliance with OOB emission limits. This may increase network performance, due to for example increase of throughput and/or decrease of interference.

Advantageously, a network node, such as the radio network node, may use the information relating to emissions for the operating configuration to treat users, e.g. the wireless device(s), in an independent and specific way. This allows the radio network node to allocate users, e.g. the wireless device, within a carrier more efficient in LTE. Furthermore, the radio network node may apply restrictions, e.g. with respect to allocation, to fulfil OOB/spurious emissions levels on a per user, e.g. per wireless device, basis rather than to all wireless devices attached to the network, or the radio network node.

BRIEF DESCRIPTION OF THE DRAWINGS

The various aspects of embodiments disclosed herein, including particular features and advantages thereof, will be readily understood from the following detailed description and the accompanying drawings, in which FIGS. 1-7 are shown.

DETAILED DESCRIPTION

Throughout the following description similar reference numerals have been used to denote similar features, such as nodes, actions, steps, modules, circuits, parts, items elements, units or the like, when applicable. In the Figures, features that appear in some embodiments are indicated by dashed lines.

In order to better appreciate the embodiments herein, it will now be returned to the scenario described in the background section. With regard to EP11799210, it has been realized that the radio network node may not be able to ensure that the OOB/spurious emissions are fulfilled for the following reason. According to EP11799210, a UE may indicate support for e.g. two filter/duplexers in different ways, but the radio network node does not know which of them is being used where the filters/duplexers overlap.

Therefore, it is herein proposed to signal information relating to OOB/spurious emissions. This can be done, as example, but not restricted to, in terms of emission levels, fulfillment to certain requirements, conditions under which certain levels are met, filter/duplexer characteristics. The conditions under which the certain levels are met may relate to which radio resources, Physical Resource Blocks (PRBs), frequency/frequencies, modulation and coding scheme, etc. is/are used when the UE transmits.

Figure 1:
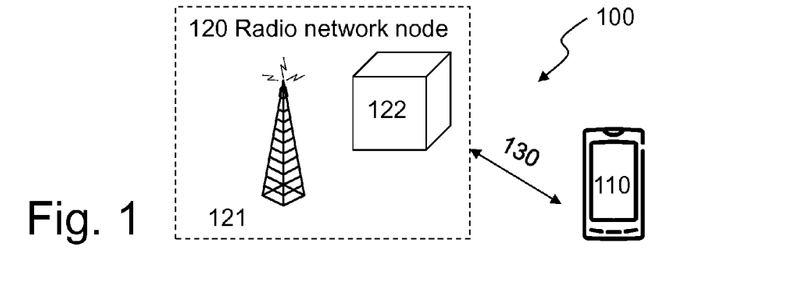
FIG. 1 is a schematic overview of an exemplifying wireless communication system in which embodiments herein may be implemented.

FIG. 1 depicts an exemplifying wireless communication system 100 in which embodiments herein may be implemented. In this example, the wireless communication system 100 is a Long Term Evolution (LTE) network. In other examples, the wireless communication network 100 may be any cellular or wireless communication system, such as a Wideband Code Division Multiple Access (WCDMA) network, High Speed Packet Access (HSPA), Wireless Fidelity (Wi-Fi), GERAN or the like. The wireless communication system 100 may be operated in FDD. The wireless communication system 100 may be deployed at an operating frequency band, such as Band 28 or other bands.

Furthermore, a wireless device 110 and a radio network node 120 are shown in FIG. 1. The wireless device 110 may implement, or be designed with, at least two duplexers/duplex filters in order to support the operating frequency band. Expressed differently, the wireless device 110 comprises at least two duplexers/duplex filters.

The radio network node 120 may serve the wireless device 110 on a carrier, which is allocated within a frequency range where the at least two duplexers overlap. See e.g. A-B in FIG. 3. This means that in at least some part of the frequency range, from A to B, the at least two duplex filters overlap. The carrier is allocated to a portion of the operating frequency band. When the radio network node 120 serves the wireless device 110, the wireless device 110 may be camping on the radio network node and/or the wireless device 110 may be connected to the radio network node 110.

The wireless device 110 and the radio network node 120 are capable of communicating 130 with each other.

The radio network node 120 may comprise an evolved NodeB (eNB) 121. Moreover, the radio network node 120 may comprise a controlling radio node 122, which may control one or more eNBs, such as the eNB 121.

Thus, the term "radio network node" may refer to an evolved Node B (eNB), a donor eNode B, a relay node, a Node B, Base Station Controller (BSC), a Radio Network Controller (RNC), a Node B, a Radio Base Station (RBS), a control node controlling one or more Remote Radio Units (RRUs), an access point, a base station or the like. The radio network node 120 thus refers to a network node which serves the wireless device 110. The radio network node 120 generally receives reports from the wireless device 110, e.g. so called UE capability information reports, and also signals the emission control parameter associated with the second network node to the wireless device.

As used herein, the term "wireless device" may refer to a user equipment, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device 110. Hence, the wireless device 110 may refer to any type of mobile terminal including mobile communication capability.

As used herein, the term "operation configuration", or "operating configuration", may refer to a combination of any of one or more of the following: Resource blocks—e.g. how many and location in the channel, Power level, Modulation and Coding Scheme (MCS), carrier, Carrier frequency and Operating band that the wireless device should use for a transmission. As an example, an operation/operating configuration may be signalled to the wireless device with a so called scheduling grant, which is known from 3GPP terminology. Concerning the operating frequency band, the wireless device 110 may need to indicate in which operating frequency band it transmits as part of the operation configuration, since OOB emissions are affected by (depend on) it. In some examples, the operating configuration relates to the carrier on which the wireless is served by the radio network node. For example, the level of power back-off for the wireless device to fulfil certain emissions is dependent on the operating frequency band.

As mentioned above, it is herein proposed to signal, from the wireless device 110, information relating to OOB/spurious emissions. The information relating to emissions for one or more operation configurations may be one or more of:
OOB/spurious emissions characteristics,
compliance/non-compliance with certain emission limits with respect to (for) an operating configuration,
operating configurations under which the wireless device will meet emission requirements, e.g. an actual power back-off for which the UE fulfils certain emission levels,
signalling duplexer/filter used (not only supported by the wireless device) and the like.

Figure 2:
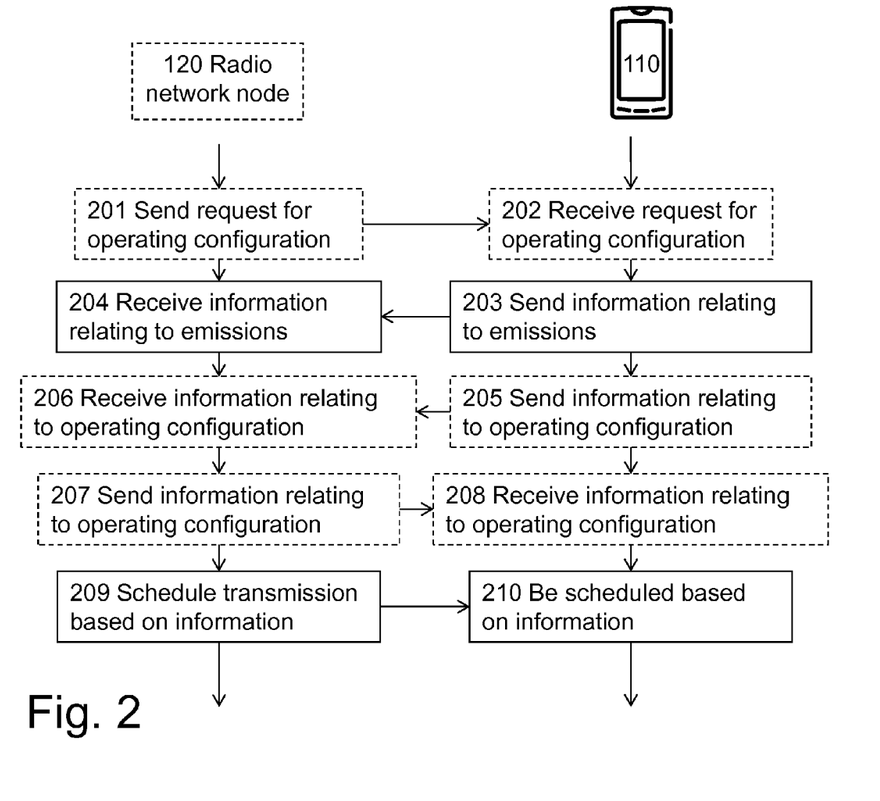
FIG. 2 is a schematic, combined signalling scheme and flowchart illustrating embodiments of the methods when performed in the wireless communication system according to FIG. 1.

FIG. 2 illustrates an exemplifying method according to embodiments herein when performed in connection with the wireless communication system 100 of FIG. 1. The radio network node 120 performs a method for scheduling transmissions of a wireless device 110. The wireless device 110 performs a method for assisting the radio network node 120 to schedule transmissions from the wireless device 110.

In some particular examples, the wireless device 110 may perform a method for enabling the radio network node 120 to manage transmissions from the wireless device 110. As an example, the radio network node 120 may manage the transmissions by scheduling the wireless device 110 according to an operating configuration or one or more operating configurations.

Again, the wireless device 110 may comprise at least two duplexers. The information relating to emissions may include information about which duplexer of said at least two duplexers the wireless device 110 is using for transmissions e.g. according to a certain operating configuration. In these cases, there is thus a possibility that the wireless device 110 may choose which one of the at least two duplexers to be used for transmitting transmissions in a frequency range at which said at least two duplexers are operable.

The following actions may be performed in any suitable order.

Action 201

In order to become aware of the information relating to emissions, the radio network node 120 may send a request for such information to the wireless device 110.

Action 202

Accordingly, subsequent to action 201, the wireless device 110 may receive the request for such information from the radio network node 120.

Action 203

In order to make the radio network node 120 aware of such information, whether requested or not, the wireless device 110 sends, to the radio network node 120, information relating to emissions. The emissions may be unwanted so called spurious emissions from the wireless device 110. The information is related to when the wireless device 110 operates according an operating configuration, e.g. a certain operating configuration. Accordingly, action 203 may be performed after actions 201 and 202 have been performed, but also when actions 201 and 202 have not been performed.

Expressed differently, the wireless device 110 sends information relating to emissions for an operation configuration to the radio network node 120.

The information relating to emissions for one or more operation configurations may be one or more of: emission levels, signalling of filter characteristics, an indication of compliance/non-compliance with an emission requirement and the like.

In further examples, the information relating to emissions (or OOB) comprises one or more of:
Yes—an indication about compliance, or no for indication under certain conditions in terms of transmitting on one or more of certain frequency, certain subcarrier, certain specific resources, using certain MCS, TB size, etc. as given by the operation configuration,
level of OOB is X under certain conditions, such as, transmit on one or more of certain frequency, certain subcarrier, certain specific resources, using certain MCS, TB size, etc. as given by the operating configuration, and an indication about which duplexer/filter the UE, such as the wireless device 110, is using to transmit/receive. The radio network node 120 uses this information to treat UEs on an individual basis.

Action 204

The radio network node 120 receives, from the wireless device 110, the information relating to emissions. Expressed somewhat differently, the radio network node 120 receives the information relating to emissions for an operating configuration from the wireless device 110.

In this manner, the radio network node 120 is made aware of the information relating to emissions.

Action 205

The wireless device 110 may send, to the radio network node 120, information relating to the operating configuration for which certain emissions levels are met.

Expressed differently, the wireless device 110 may send information relating to the operation configurations for which certain emission levels are met to the radio network node 120.

Action 206

The radio network node 120 may receive, from the wireless device 110, information relating to the operating configuration for which certain emissions levels are met.

Expressed differently, the radio network node 120 may receive the information relating to the operation configurations for which certain emission levels are met to the radio network node 120.

As a result, the radio network node 120 may know that the certain emissions levels are met by the wireless device 110 when the radio network node 120 schedules the wireless device according to the information relating to the operation configuration.

Action 207

The radio network node 120 may send, to the wireless device 110, information relating to the operating configuration for which certain emissions levels are met. In this manner, the radio network node 120 informs the wireless device 110 about which operating configuration the wireless device 110 may use while still fulfilling certain emission levels.

Action 208

The wireless device 110 may receive, from the radio network node 120, information relating to the operating configuration for which certain emissions levels are met. Hence, the wireless device 110 may be aware of that if, or when, the wireless device 110 transmits according to the operation configuration, given by the received information, the emission levels are met. As a result, the wireless device 110 may refrain from transmitting according to other operating configurations for which the emission levels cannot be, or are not, met.

Action 209

Now that the radio network node 120 is aware of when the wireless device fulfils e.g. radio emission requirements, the radio network node 120 schedules 209 the transmissions based on the received information. This means that the radio network node 120 schedules the wireless device 110 in such a way that the radio emission requirements are fulfilled. The scheduling may thus be restricted to using e.g. particular radio resources, resource blocks, modulation and coding schemes etc. as mentioned above.

Expressed differently, the radio network node 120 may use the received information. As an example, the radio network node 120 may manage transmissions from the wireless device 110 based on the received information. In more detail, the radio network node 120 may treat, such as schedule for LTE, the wireless device 110 while taking the received information into account.

Action 210

As a result of action 209, the wireless device 110 is scheduled, by the radio network node 120, based on the information.

According to the description above, several embodiments are disclosed. These embodiments are described in more detail the following sections.

According to some first embodiments, a method, performed by the wireless device 110, for signalling of OOB emissions/spurious emissions characteristics for a specific band is disclosed. Expressed differently, the wireless device 110, or UE, signals OOB emissions/spurious emissions characteristics for a specific band.

In this embodiment, the wireless device 110 reports, or sends, to the radio network node specific unwanted emissions characteristics as part of its capabilities. The wireless device 110 may report one or more characteristics.

In a first example, the wireless device 110 reports specific unwanted emissions levels for a specific operating configuration. Multiple emission levels can be signalled by repeatedly signalling emission levels for one specific configuration.

In a second example, the wireless device 110 reports specific unwanted emissions levels and the part of the spectrum on which these are met. The "spectrum" information can include, but not limited to, frequency numbers, EARFCN for LTE or UARFCN for HSPA.

In a separate example, the wireless device 110 signals the unwanted emissions as an input parameter into a function for computing the emission level.

In another example, the unwanted emissions characteristics can be reported for different operating configurations. This can be done for example, but not limited to, by signalling one or more index into a table listing the configurations under which the emissions apply. The tables may be predefined in the standard and preloaded in the wireless device 110 or the content may be transferred from the BS to the wireless device 110 using higher level protocols.

In another example, the wireless device 110 unwanted emissions characteristics can be reported for different operating configurations. The emission levels and operating configurations may be signalled by signalling an input parameter to a function that associates the emission levels and operating configurations. The wireless device 110 signals the input parameter to a function located in the radio network node.

According to some second embodiments, the wireless device 110 performs a method for signalling of operating configurations under which the wireless device 110 will meet emission requirement. Expressed differently, the wireless device 110 signals operating band characteristics for a specific band.

In these embodiments, the wireless device 110 reports to the radio network node specific characteristics for certain operating band as part of its capabilities. The wireless device 110 may thus report one or more characteristics:

In a first example, the wireless device 110 reports compliance or no compliance with certain OOB/spurious emissions characteristics.

In a second example, the wireless device 110 indicates the conditions to fulfil specific OOB/spurious emissions characteristics.

This may be signalled by listing all the operating configurations that the emission requirements are met under, all operating configurations under which the requirements are not, signalling one or more index into a table listing the configurations under which the requirements are met or by signalling one or more index into a table listing the configurations under which the requirements are not met, or by using a combination of these methods. The tables may be predefined in the standard and preloaded in the wireless device 110 or the content may be transferred from the BS to the wireless device 110 using higher level protocols In a separate example, the wireless device 110 reports the amount of A-MPR that is needed to fulfil certain OOB/spurious emissions.

In some third embodiments, the wireless device 110 signals duplexer/duplex filter characteristics for a specific band. Hence, in these embodiments the wireless device 110 performs a method for signalling of duplexer/filter capability.

In these embodiments, the wireless device 110 reports to the radio network node its duplexer/filter characteristics as part of its capabilities. The wireless device 110 may report one or more parameters associated with or which depict its supported duplexer arrangement characteristics to the radio network node.

In a first example, the wireless device 110 may report the specific filter or duplexer it is using to transmit and/or receive signals.

As example, but not limited to, information regarding the start-stop frequencies of the used filter, or the start-stop EARFCN for LTE, UARFCN for HSPA could be used to characterized the used filter/duplexer.

In a second example, the wireless device 110 may report the number of filters implemented to support the band. UE1 may support a single filter/duplexer while UE2 implements 2 overlapping filters/duplexers, for example.

In another example, the wireless device 110 may report the information associated with the channel numbers (e.g. EARFCN for LTE, UARFCN for HSPA etc.), for each filter/duplexer used.

In a separate example, the wireless device 110 may report the information associated with the frequencies (for example in Hz)(for each filter/duplexer).

In another example, the wireless device 110 may report any combination of information regarding its filter/duplexer arrangement. For instance, the wireless device 110 could report the channel numbers associated to the implemented filter/duplexers for a band and the information regarding which filter/duplexer that it is/will be using for the transmission/reception on an specific band.

In some fourth embodiments, the radio network node 120 uses the UE capability information. The radio network node 120 may thus select UE emission control parameter based on UE capability information. Furthermore, the radio network node may select mobility parameters based on received UE capability information. The radio network node may forward the received UE capability information to a second node, such as radio network node to which the UE is about to be handed over, or is handed over to. The second node may then not need to request the UE capability information from the UE. Moreover, a method in a third network node of using the received information for network management task is provided.

In these embodiments, the radio network node uses the capability information received by the wireless device 110 and treat wireless devices differently depending on their operating band characteristics.

As an example, but not limited to, the radio network node can compute the emissions of the wireless device 110 by using the duplex/filter characteristics of the wireless device 110 in combination with information from the standard (standard specification) about the emissions generated by the wireless device 110. This information can be used to place the wireless device 110 within the channel bandwidth to maximize network performance, e.g. during scheduling of the wireless device 110.

Figure 3:
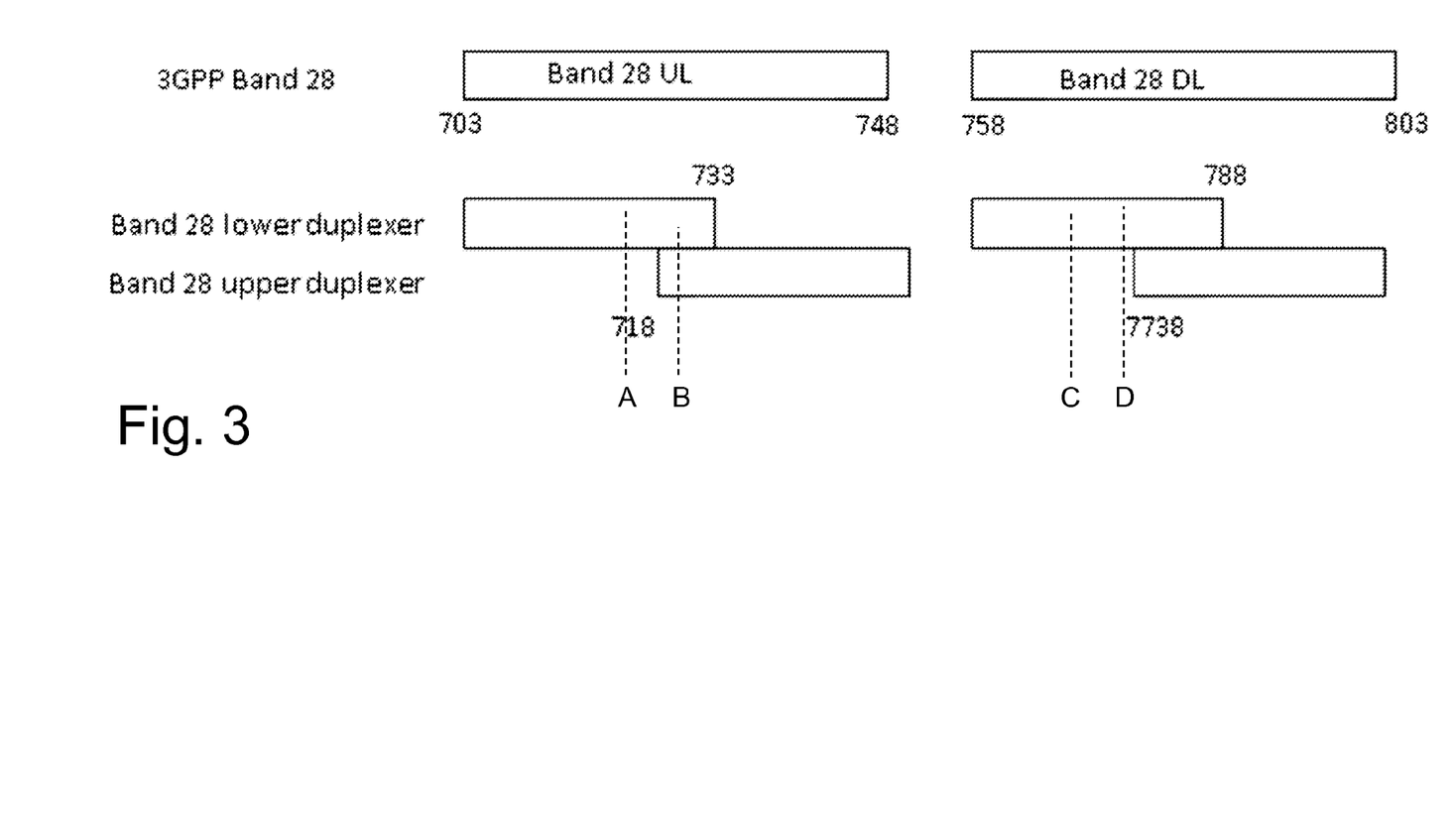
FIG. 3 is a schematic illustration of a frequency band in relation to coverage of two duplexers.

Returning to FIG. 3, it is noted that the embodiments herein may be particular useful for operation, such as transmit and/or receive (Tx/Rx), between A and B in the Figure and/or between C and D in the Figure. A region A and B in the Figure and/or between C and D in the Figure may indicate an overlapping portion in which the upper and lower filters both allow transmission to pass through the filters. In this example, there may be wireless devices that transmit/receive (TX/RX) via the lower filter or via the upper filter. When the radio network node 120 receives information as disclosed herein by action 204 and/or 206 the radio network node 120 may use this information in one or more of the following ways:

1. A wireless device using the lower filter (band 28 lower duplexer' in the Figure) will not fulfil certain regulatory requirements below A MHz. There is no filter rejection in this case, so the eNB (radio network node) needs to schedule the wireless device in specific places within the channel bandwidth (e.g. shown as "band 28 UL").
2. A wireless device using the upper filter (band 28 upper duplexer' in the Figure) will fulfil certain regulatory requirements below A MHz, thanks to filter rejection.

Filter rejection means that the filter removes emission outside a pass-band (in which emission is allowed to be transmitted/received) of the filter.

Figure 4:
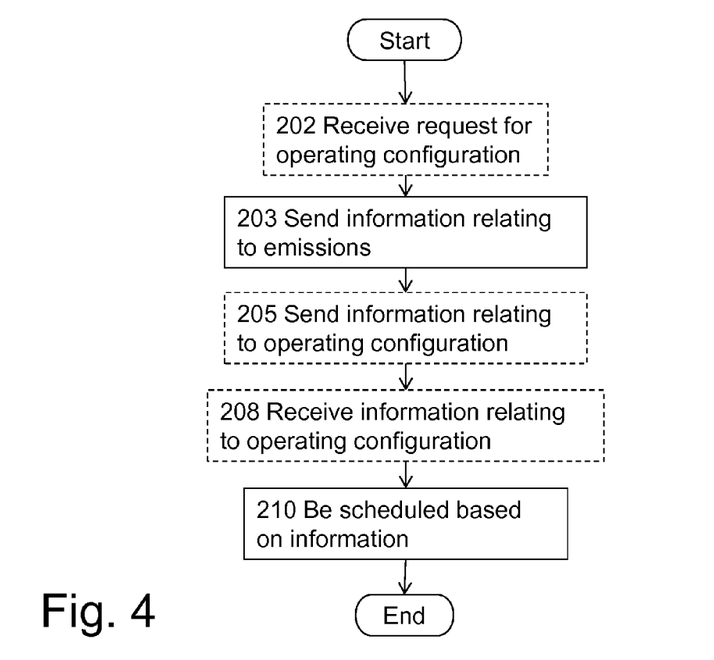
FIG. 4 is a flowchart illustrating embodiments of the method in the wireless device.

In FIG. 4, an exemplifying, schematic flowchart of embodiments of the method of the wireless device 110 as illustrated in FIG. 2 above is shown. The wireless device 110 thus performs a method for assisting the radio network node 120 to schedule transmissions from the wireless device 110. As mentioned, the same reference numerals have been used to denote the same or similar actions.

Also, the wireless device 110 may comprise at least two duplexers, wherein the information relating to emissions may include information about which duplexer of said at least two duplexers the wireless device 110 is using for transmissions.

The following actions may be performed in any suitable order.

Action 202

The wireless device 110 may receive, from the radio network node 120, a request for the information relating to emissions.

Action 203

The wireless device 110 sends, to the radio network node 120, information relating to emissions, from the wireless device 110, when the wireless device 110 operates according an operating configuration.

Action 205

The wireless device 110 may send, to the radio network node 120, information relating to the operating configuration for which certain emissions levels are met.

Action 208

The wireless device 110 may receive, from the radio network node 120, information relating to the operating configuration for which certain emissions levels are met.

Action 210

The wireless device 110 is scheduled, by the radio network node 120, based on the information.

Figure 5:
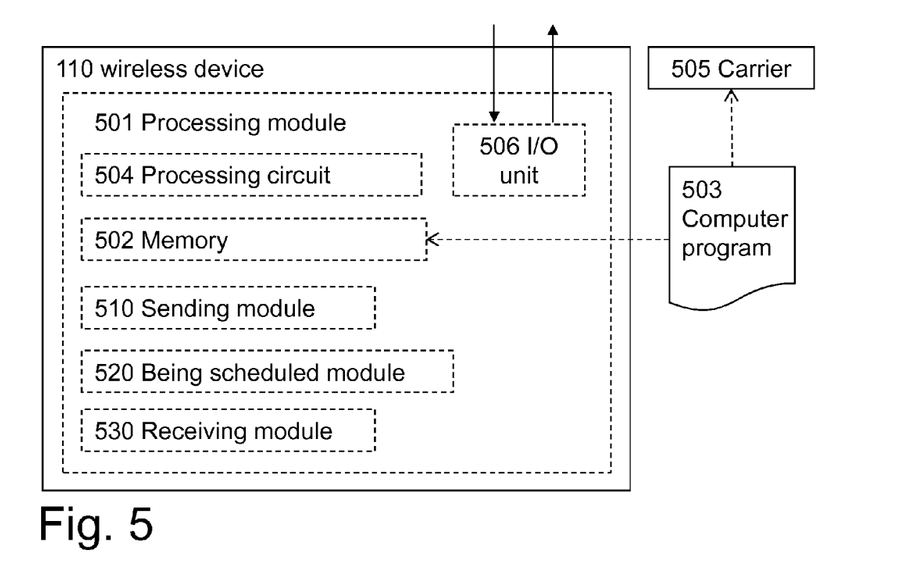
FIG. 5 is a block diagram illustrating embodiments of the wireless device.

With reference to FIG. 5, a schematic block diagram of embodiments of the wireless device 110 of FIG. 1 is shown. The wireless device 110 is configured to assist the radio network node 120 to schedule transmissions from the wireless device 110.

As mentioned, the wireless device 110 may comprise at least two duplexers, wherein the information relating to emissions may include information about which duplexer of said at least two duplexers the wireless device 110 is using for transmissions.

The wireless device 110 may comprise a processing module 501, such as a means, one or more hardware modules and/or one or more software modules for performing the methods described herein.

The wireless device 110 may further comprise a memory 502. The memory may comprise, such as contain or store, a computer program 503.

According to some embodiments herein, the processing module 501 comprises, e.g. 'is embodied in the form of' or 'realized by', a processing circuit 504 as an exemplifying hardware module. In these embodiments, the memory 502 may comprise the computer program 503, comprising computer readable code units executable by the processing circuit 504, whereby the wireless device 110 is operative to perform the methods of FIG. 2 and/or FIG. 4.

In some other embodiments, the computer readable code units may cause the wireless device 110 to perform the method according to FIG. 2 and/or FIG. 4 when the computer readable code units are executed by the wireless device 110.

FIG. 5 further illustrates a carrier 505, comprising the computer program 503 as described directly above. The carrier 505 may be one of an electronic signal, an optical signal, a radio signal, and a computer readable medium.

In some embodiments, the processing module 501 comprises an Input/Output unit 506, which may be exemplified by a receiving module and/or a sending module as described below when applicable.

In further embodiments, the processing module 501 may comprise one or more of a sending module 510, being scheduled module 520 and a receiving module 530 as an exemplifying hardware module. In other examples, the aforementioned exemplifying hardware modules may be implemented as one or more software modules.

Therefore, according to the various embodiments described above, the wireless device 110 is operative to and/or the wireless device 110, the processing module 501 and/or the sending module 510 is configured to send the information as described in action 203 and/or 205.

This means that the wireless device 110 is operative to and/or the wireless device 110, the processing module 501 and/or the sending module 510 is configured to send, to the radio network node 120, information relating to emissions, from the wireless device 110, when the wireless device 110 operates according to an operating configuration.

The wireless device 110 is operative to and/or the wireless device 110, the processing module 501 and/or the being scheduled module 520 is configured to be scheduled, by the radio network node 120, based on the information.

The wireless device 110 may be operative to and/or the wireless device 110, the processing module 501 and/or the receiving module 530 may be configured to receive, from the radio network node 120, information relating to the operating configuration for which certain emissions levels are met.

The wireless device 110 may be operative to and/or the wireless device 110, the processing module 501 and/or the sending module 510, or another sending module (not shown), may be configured to send, to the radio network node 120, information relating to the operating configuration for which certain emissions levels are met.

The wireless device 110 may be operative to and/or the wireless device 110, the processing module 501 and/or the receiving module 530, or another receiving module (not shown), may be configured to receive, from the radio network node 120, a request for the information relating to emissions.

Figure 6:
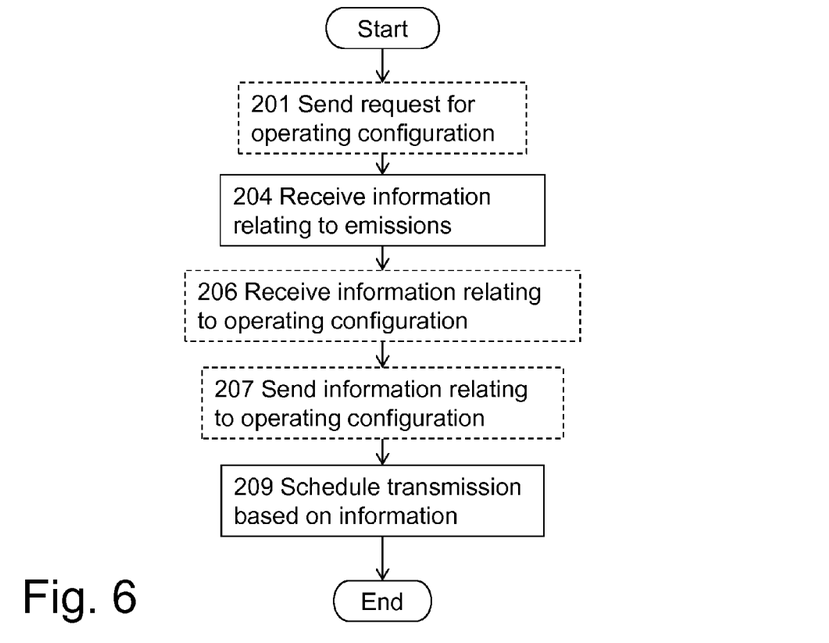
FIG. 6 is a flowchart illustrating embodiments of the method in the radio network node.

In FIG. 6, an exemplifying, schematic flowchart of embodiments of the method performed by the radio network node 120 as illustrated in FIG. 2 above is shown. The radio network node 120 thus performs a method for scheduling transmissions of a wireless device 110. As mentioned, the same reference numerals have been used to denote the same or similar actions.

Again, the wireless device 110 may comprise at least two duplexers, wherein the information relating to emissions may include information about which duplexer of said at least two duplexers the wireless device 110 is using for transmissions.

The following actions may be performed in any suitable order.

Action 201

The radio network node 120 may send, to the wireless device 110 a request for the information relating to emissions.

Action 204

The radio network node 120 receives, from the wireless device 110, information relating to emissions, from the wireless device 110, when the wireless device 110 operates according to an operating configuration.

Action 206

The radio network node 120 may receive, from the wireless device 110, information relating to the operating configuration for which certain emissions levels are met.

Action 207

The radio network node 120 may send, to the wireless device 110, information relating to the operating configuration for which certain emissions levels are met.

Action 209

The radio network node 120 schedules the transmissions based on the received information.

Figure 7:
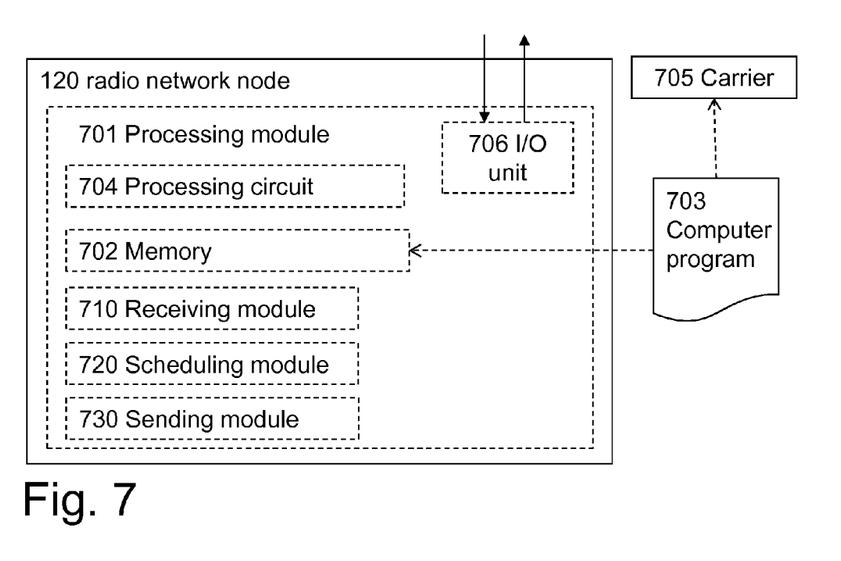
FIG. 7 is a block diagram illustrating embodiments of the radio network node.

With reference to FIG. 7, a schematic block diagram of embodiments of the radio network node 120 of FIG. 1 is shown. The radio network node 120 configured to schedule transmissions of the wireless device 110.

As mentioned, the wireless device 110 may comprise at least two duplexers, wherein the information relating to emissions may include information about which duplexer of said at least two duplexers the wireless device 110 is using for transmissions.

The radio network node 120 may comprise a processing module 701, such as a means, one or more hardware modules and/or one or more software modules for performing the methods described herein.

The radio network node 120 may further comprise a memory 702. The memory may comprise, such as contain or store, a computer program 703.

According to some embodiments herein, the processing module 701 comprises, e.g. 'is embodied in the form of' or 'realized by', a processing circuit 704 as an exemplifying hardware module. In these embodiments, the memory 702 may comprise the computer program 703, comprising computer readable code units executable by the processing circuit 704, whereby the radio network node 120 is operative to perform the methods of FIG. 2 and/or FIG. 6.

In some other embodiments, the computer readable code units may cause the radio network node 120 to perform the method according to FIGS. 2 and/or 6 when the computer readable code units are executed by the radio network node 120.

FIG. 7 further illustrates a carrier 705, comprising the computer program 703 as described directly above. The carrier 705 may be one of an electronic signal, an optical signal, a radio signal, and a computer readable medium.

In some embodiments, the processing module 601 comprises an Input/Output unit 706, which may be exemplified by a receiving module and/or a sending module as described below when applicable.

In further embodiments, the processing module 701 may comprise one or more of a receiving module 710, a scheduling module 720 (or using module) and a sending module 730 as exemplifying hardware modules. In other examples, one or more of the aforementioned exemplifying hardware modules may be implemented as one or more software modules.

Therefore, according to the embodiments above, the radio network node 120 is operative to and/or the radio network node 120, the processing module 701 and/or the receiving module 710 is configured to receive, from the wireless device 110, information relating to emissions, from the wireless device 110, when the wireless device 110 operates according to an operating configuration. In some examples, the radio network node 120 is operative to and/or the radio network node 120, the processing module 701 and/or the receiving module 710 is configured to receive the information as described in action 204 and/or 206.

The radio network node 120 is operative to and/or the radio network node 120, the processing module 701 and/or the scheduling module 720 is configured to schedule the transmissions based on the received information. In some examples, the radio network node 120 is operative to and/or the radio network node 120, the processing module 701 and/or the scheduling (using) module 720 is configured to use the information as described in action 209, e.g. schedule the transmission.

The radio network node 120 may be operative to and/or the radio network node 120, the processing module 701 and/or the receiving module 710, or a further receiving module (not shown) may be configured to receive, from the wireless device 110, information relating to the operating configuration for which certain emissions levels are met.

The radio network node 120 may be operative to and/or the radio network node 120, the processing module 701 and/or the sending module 730 may be configured to send, to the wireless device 110 a request for the information relating to emissions.

As used herein, the term "processing module" may in some examples refer to the processing circuit, such as a processing unit, a processor, an Application Specific integrated Circuit (ASIC), a Field-Programmable Gate Array (FPGA) or the like. The processing circuit or the like may comprise one or more processor kernels. In these examples, the processing module is thus embodied by a hardware module. In other examples, the processing module may be embodied by a software module. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a radio network node, for scheduling transmissions of a wireless device, wherein the method comprises:
   receiving, from the wireless device, information relating to emissions from the wireless device when the wireless device operates according to an operating configuration, wherein the wireless device comprises at least two duplexers and wherein the information relating to emissions includes information about which duplexer of said at least two duplexers the wireless device is using for transmissions; and
   scheduling the transmissions based on the received information.

2. The method of claim 1, wherein the information relating to emissions indicates one or more operating configurations for which certain emissions levels are met.

3. The method of claim 1, wherein the information relating to emissions indicates whether or not the wireless device meets certain emissions level for a given operating configuration.

4. The method of claim 1, wherein the information relating to emissions specifies emission levels for one or more operating configurations.

5. The method of claim 1, wherein the method comprises sending, to the wireless device a request for the information relating to emissions.

6. A method, performed by a wireless device, for assisting the radio network node to schedule transmissions from the wireless device, wherein the method comprises:
sending, to the radio network node, information relating to emissions, from the wireless device, when the wireless device operates according to an operating configuration, wherein the wireless device comprises at least two duplexers and wherein the information relating to emissions includes information about which duplexer of said at least two duplexers the wireless device is using for transmissions, and
being scheduled, by the radio network node, based on the information.

7. The method of claim 6, wherein the information relating to emissions indicates one or more operating configurations for which certain emissions levels are met.

8. The method of claim 6, wherein the information relating to emissions indicates whether or not the wireless device meets certain emissions level for a given operating configuration.

9. The method of claim 6, wherein the information relating to emissions specifies emission levels for one or more operating configurations.

10. The method of claim 6, wherein the method comprises receiving, from the radio network node, information relating to the operating configuration for which certain emissions levels are met.

11. The method of claim 6, wherein the method comprises receiving, from the radio network node, a request for the information relating to emissions.

12. A radio network node configured to schedule transmissions of a wireless device, wherein the radio network node comprises:
a processing circuit and memory operatively coupled to the processing circuit, wherein the memory stores a computer program comprising instructions configured to cause the radio network node to:
receive, from the wireless device, information relating to emissions from the wireless device when the wireless device operates according to an operating configuration, wherein the wireless device comprises at least two duplexers and wherein the information relating to emissions includes information about which duplexer of said at least two duplexers the wireless device is using for transmissions; and
schedule the transmissions based on the received information.

13. The radio network node of claim 12, wherein the information relating to emissions indicates one or more operating configurations for which certain emissions levels are met.

14. The radio network node of claim 12, wherein the information relating to emissions indicates whether or not the wireless device meets certain emissions level for a given operating configuration.

15. The radio network node of claim 12, wherein the information relating to emissions specifies emission levels for one or more operating configurations.

16. The radio network node of claim 12, wherein the instructions are further configured to cause the radio network node to send, to the wireless device a request for the information relating to emissions.

17. A wireless device configured to assist the radio network node to schedule transmissions from the wireless device, wherein the wireless device comprises:
a processing circuit and memory operatively coupled to the processing circuit, wherein the memory stores a computer program comprising instructions configured to cause the wireless device to:
send, to the radio network node, information relating to emissions from the wireless device when the wireless device operates according to an operating configuration, wherein the wireless device comprises at least two duplexers and wherein the information relating to emissions includes information about which duplexer of said at least two duplexers the wireless device is using for transmissions; and
be scheduled, by the radio network node, based on the information.

18. The wireless device of claim 17, wherein the information relating to emissions indicates one or more operating configurations for which certain emissions levels are met.

19. The wireless device of claim 17, wherein the information relating to emissions indicates whether or not the wireless device meets certain emissions level for a given operating configuration.

20. The wireless device of claim 17, wherein the information relating to emissions specifies emission levels for one or more operating configurations.

21. The wireless device of claim 17, wherein the instructions are further configured to cause the wireless device to send, to the radio network node, information relating to the operating configuration for which certain emissions levels are met.

22. The wireless device of claim 17, wherein the instructions are further configured to cause the wireless device to receive, from the radio network node, a request for the information relating to emissions.

23. A non-transitory computer-readable medium comprising, stored thereupon, a computer program comprising computer readable code units configured so that, when executed by a processor of a radio network node, the computer-readable code units cause the radio network node to:
receive, from a wireless device, information relating to emissions from the wireless device when the wireless device operates according to an operating configuration, wherein the wireless device comprises at least two duplexers and wherein the information relating to emissions includes information about which duplexer of said at least two duplexers the wireless device is using for transmissions; and
schedule transmissions of the wireless device based on the received information.

24. A non-transitory computer-readable medium comprising, stored thereupon, a computer program comprising computer readable code units configured so that, when executed by a processor of a wireless device, the computer-readable code units cause the wireless device to:
send, to the radio network node, information relating to emissions from the wireless device when the wireless device operates according to an operating configuration, wherein the wireless device comprises at least two duplexers and wherein the information relating to emissions includes information about which duplexer of said at least two duplexers the wireless device is using for transmissions; and be scheduled, by the radio network node, based on the information.

\* \* \* \* \*